United States Patent
Tsutsumitake

[11] Patent Number: 5,857,206
[45] Date of Patent: Jan. 5, 1999

[54] INFORMATION PROCESSING APPARATUS WITH NETWORK COMMUNICATION FUNCTION AND INFORMATION ACCESS EMPLOYED IN THE APPARATUS

[75] Inventor: Hideyuki Tsutsumitake, Yokohama, Japan

[73] Assignee: Kabushiki Kaisha Toshiba, Kanagawa-ken, Japan

[21] Appl. No.: 790,706

[22] Filed: Jan. 29, 1997

[30] Foreign Application Priority Data

Jan. 31, 1996 [JP] Japan ................................. 8-015670

[51] Int. Cl.⁶ .................................................. G06F 17/30
[52] U.S. Cl. ...................... 707/203; 395/200.33; 707/511
[58] Field of Search .................................. 707/203, 511; 395/200.33

[56] References Cited

U.S. PATENT DOCUMENTS

| 5,388,255 | 2/1995 | Pytlik et al. | 707/4 |
| 5,511,188 | 4/1996 | Pascucci et al. | 707/203 |
| 5,701,457 | 12/1997 | Fujiwara et al. | 707/8 |
| 5,781,915 | 7/1998 | Kohno et al. | 707/511 |

FOREIGN PATENT DOCUMENTS

| 6-266599 | 9/1994 | Japan | G06F 12/00 |
| 7-084903 | 3/1995 | Japan | G06F 13/00 |

Primary Examiner—Parshotam S. Lall
Assistant Examiner—Kenneth R. Coulter
Attorney, Agent, or Firm—Limbach & Limbach LLP

[57] ABSTRACT

If an information item tried to be accessed during traveling is stored in a memory unit, an identifier indicating the information item is registered in an unaccessed-information management unit. If, on the other hand, the information item is stored in the memory unit, the information item is displayed and the identifier is registered in an old information access management unit. When a portable information processing apparatus has come to be able to be connected to a network, an information item indicated by the identifier registered in the unaccessed-information management unit is taken in from a server. Further, whether or not the information item indicated by the identifier registered in the old information access management unit is of an updated version is determined on the basis of the storage date of the information item and the creation date of the information item stored in the server and indicated by the identifier. If the information item is not of the updated version, the information item stored in the server is taken in. As a result, the updated version of an information item tried to be accessed when the information processing apparatus could not be connected to the network can be effectively taken in when the processing apparatus has been connected to the network.

18 Claims, 5 Drawing Sheets

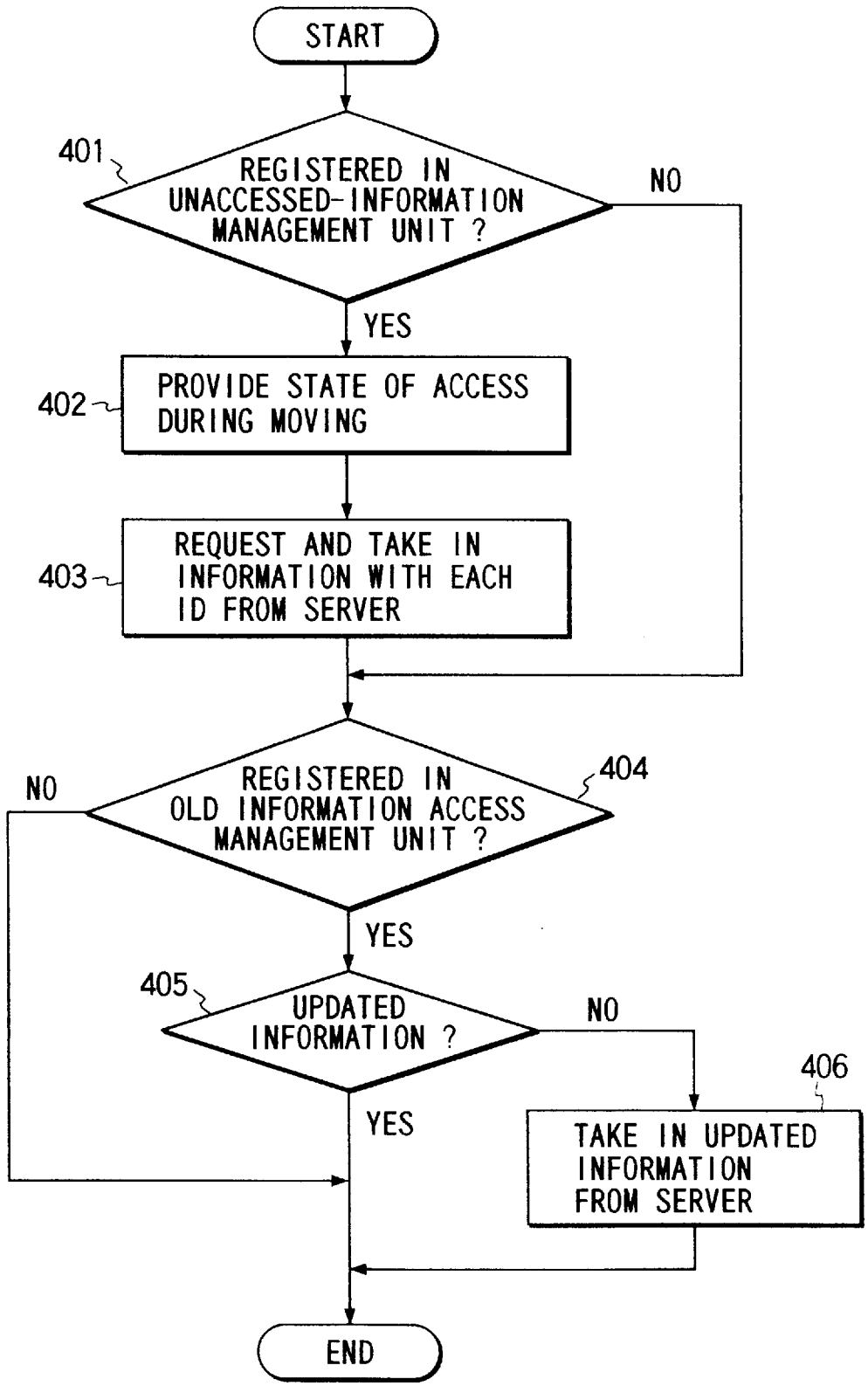
F I G. 5

INFORMATION PROCESSING APPARATUS WITH NETWORK COMMUNICATION FUNCTION AND INFORMATION ACCESS EMPLOYED IN THE APPARATUS

BACKGROUND OF THE INVENTION

The present invention relates to an information processing apparatus accessible to information on a network when it is connected to the network, and also to an information access method employed in the apparatus.

In accordance with downsizing of information processing apparatuses or development of their performance, so-called portable information processing apparatuses which can easily be carried by any person have been put on the market. These portable information processing apparatuses are characterized in that they can access anytime and anywhere necessary information stored in servers on the network when they are connected to the network. Further, the portable information processing apparatuses each can transfer a document created by itself, to a server through the network, and take in a document from a server through the network. In addition, the apparatuses can annotate on the taken-in document with an input unit such as a dedicated pen, and also edit the document.

However, such an information processing apparatus as represented by the above-described portable type apparatus to be connected to the network cannot always access necessary information through the network. For example, there may well be an occasion in which the portable apparatus cannot be connected to the network. If a desired document which belongs to a server is already taken-in and stored in the portable apparatus, the user of the apparatus can see the document. At this time, however, the user cannot know whether the stored document is an updated one. Thus, where the portable apparatus is disconnected from the network, it is necessary for the user to keep in mind that he or she must examine later whether the document stored in the portable apparatus is an updated one.

Moreover, where the desired document could not be accessed in the last occasion of access and hence is not stored in the portable apparatus, the user must keep in mind the document which could not be accessed, since he needs to access it again when the portable apparatus is connected to the network.

In summary, in an information processing apparatus represented by the above-described portable type apparatus to be connected to a network, the user must keep in mind, when he has accessed information stored in the apparatus which is disconnected from the network, that he needs to examine later whether the accessed information is updated one. Furthermore, the user must keep in mind that if it is determined, when the apparatus has been connected to the network, that the accessed information is not updated one, he needs to access the updated information.

BRIEF SUMMARY OF THE INVENTION

Accordingly, it is the object of the present invention to provide an information processing apparatus capable of efficiently providing updated information to the user without troubling him (or her), even if there occurs an occasion in which the apparatus cannot be connected to a network.

According to an aspect of the present invention, there is provided an information processing apparatus comprising: network communication means which can be connected to a network for taking, from a server on the network, an information item discriminated by an identifier dedicated thereto; storage means for storing the information item with a creation date or a storage date attached thereto; a display unit for displaying the information item; an input unit for adding another information item to the displayed information item; unaccessed-information management means for registering therein, in a first state in which an information item having the same identifier as an information item tried to be accessed when the information processing apparatus could not be connected to the network is not stored in the storage means, the same identifier, the registered same identifier being used when the information processing apparatus is connected to the network; and old information access management means for registering therein, in a second state in which an information item having the same identifier as an information item tried to be accessed when the information processing apparatus could not be connected to the network is stored in the storage means, the same identifier, the registered same identifier being used when the information processing apparatus is connected to the network.

The information processing apparatus may further comprise display means for controlling the display unit in the second state so as to display thereon the information item with the same identifier stored in the storage means. Further, the information processing apparatus may further comprise first control means for controlling the network communication means so as to take in, from the server, an information item indicated by each identifier registered in the unaccessed-information management means when the information processing apparatus can be connected to the network. The information processing apparatus may further comprise determination means for determining, when the information processing apparatus can be connected to the network, whether or not the information item stored in the storage means and indicated by the each identifier registered in the old information access management means is of an updated version, on the basis of a date attached to the information item stored in the storage means and a creation date of an information item currently stored in the server and having the same identifier as the information item stored in the storage means. Moreover, the information processing apparatus may further comprise second control means for controlling the network communication means so as to take in, from the server, an information item of an updated version having the same identifier as the information item stored in the storage means, when the determination means has determined that the information item stored in the storage means is of the updated version.

Each information item stored in the storage means may include a series-of-data display flag indicating whether or not the information item is included in a series of information items accessed at a time. In this case, the information processing apparatus may further comprise determination prohibition means for determining, when the information processing apparatus can be connected to the network, whether or not the information item is included in a series of information items accessed at a time, with reference to the series-of-data display flag which is included in the information item stored in the storage means and indicated by the each identifier registered in the old information access management means, thereby prohibiting the determination by the determination means when the information item is included in the series of information items.

In the information processing apparatus, the determination means may determine, even if an information item having the same identifier as an information item tried to be accessed when the information processing apparatus was connected to the network is stored in the storage means, whether or not the information item stored in the storage means is of an updated version, using a date attached to the information item stored in the storage means and a creation date of the information item currently stored in the server and having the same identifier as the information item stored in the storage means. In this case, each information item stored in the storage means may include a series-of-data display flag indicating whether or not the information item is included in a series of information items accessed at a time. Also in this case, the information processing apparatus may further comprise determination prohibition means for determining, when the information processing apparatus can be connected to the network, whether or not the information item is included in a series of information items accessed at a time, with reference to the series-of-data display flag which is included in the information item stored in the storage means and indicated by the each identifier registered in the old information access management means, thereby prohibiting the determination by the determination means when the information item is included in the series of information items.

In the information processing apparatus, each information item stored in the storage means may include an annotation display flag indicating whether or not the information item is annotated. In this case, the determination means may refer to the annotation display flag included in each of the information items stored in the storage means and indicated by the identifiers registered in the old information access management means, thereby performing determination as to whether each information item is of an updated version in the order beginning from the annotated information item. Furthermore, when the annotation display flag included in an old information item stored in the storage means and corresponding to the information item of the updated version indicates that the old information item is annotated, the second control means makes the old information item left as an old version of the updated information item.

The information processing apparatus may process information of a hypermedia structure comprising nodes and links. In this case, the information processing apparatus may further comprise third control means for informing the user, via the display unit by the display means, of that an information item at a target node is tried to be accessed for the first time, and thereafter inactivating a link extending between the target node and another node leading thereto. Moreover, the information processing apparatus may also comprise access record management means for storing an identifier indicative of a node tried to be accessed through another node, and a record of access to a link connecting both the nodes. The information processing apparatus may further comprise fourth control means for referring, when connection to the network has been permitted, to an identifier indicative of the node, which could not be accessed and hence is registered in the unaccessed-information management means, and also to the record of access stored in the access record management means, thereby to detect the node located immediately before the node tried to be accessed, and to display the detection result on the display unit by means of the display means.

According to another aspect of the present invention, there is provided an information access method employed in an information processing apparatus which can be connected to a network for taking, from a server on the network, an information item discriminated by an identifier dedicated thereto, and storing the information item, comprising the steps of: storing the information item with a creation date or a storage date; registering, in a first state in which an information item having the same identifier as an information item tried to be accessed when the information processing apparatus could not be connected to the network is not stored in the information processing apparatus, the same identifier; registering and displaying, in a second state in which an information item having the same identifier as an information item tried to be accessed when the information processing apparatus could not be connected to the network is stored in the information processing apparatus, the same identifier; and taking in, through the network, an information item stored in the server and indicated by the identifier registered in the first state, and determining whether or not the information item stored in the information processing apparatus and indicated by the identifier registered in the second state is of an updated version, on the basis of a date attached to the information item stored in the information processing apparatus and a creation date of an information item currently stored in the server and indicated by the same identifier as that of the information item stored in the information processing apparatus, thereby taking in, from the server through the network, the information item of the updated version if the information item stored in the information processing apparatus is older than the information item of the updated version, when the information processing apparatus is connected to the network.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 5 is a flowchart, useful in explaining the processing to take in, at a time, all information tried to be accessed during traveling;

DETAILED DESCRIPTION OF THE INVENTION

The embodiment of the present invention will be described with reference to the accompanying drawings.

Figure 1:
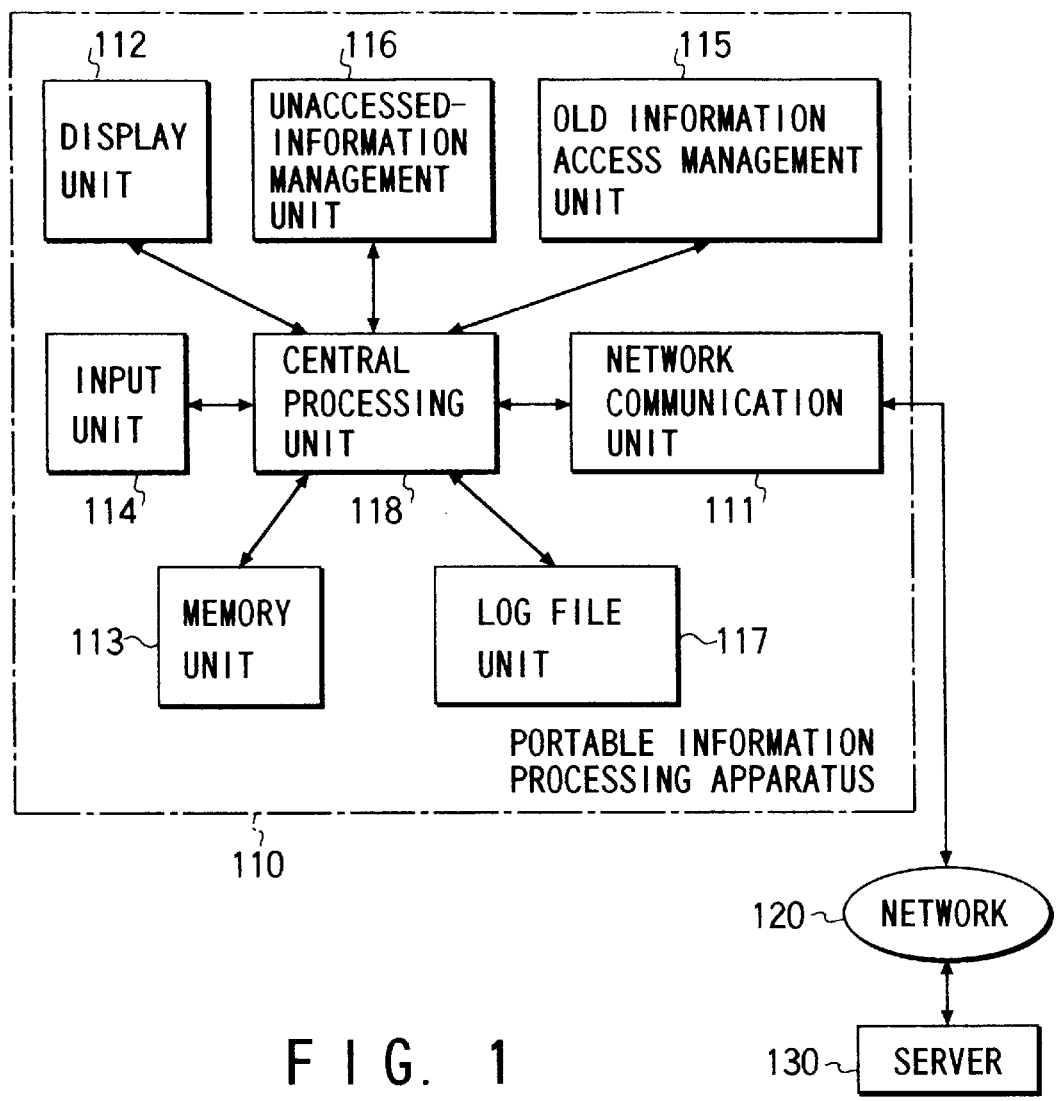
FIG. 1 is a block diagram, showing the structure of a system including a portable information processing apparatus according to the embodiment of the present invention.

FIG. 1 is a block diagram, showing the structure of a system including a portable information processing apparatus according to the embodiment of the present invention.

A portable information processing apparatus 110 shown in FIG. 1 is capable of taking in information through a network when it is connected to the network. Specifically, the processing apparatus 110 can be connected to a network 120 which enables data transfer between various processing apparatuses. The network 120 is connected to a server 130 capable of storing a great amount of information and transferring/receiving information to/from any one of the information processing apparatuses including the portable information processing apparatus 110.

The portable information processing apparatus 110 enables the user not only to take in information through the network 120 when it is connected thereto, but also to annotate the information taken-in and displayed on its screen with a dedicated pen, etc. The apparatus 110 comprises a network communication unit 111, a display unit 112, a memory unit 113, an input unit 114, an old information access management unit 115, an unaccessed-information management unit 116, a log file unit 117 and a central processing unit 118.

The network communication unit 111 has a function for connecting the portable information processing apparatus 110 to the network 120, and controls data take-in through the network 120 connected thereto and data transfer to the network 120.

The display unit 112 consists of a liquid crystal display, etc. for displaying information such as a document for the user.

The memory unit 113 consists of a large capacity memory unit such as a magnetic disk for storing information taken-in from the server 130 through the network 120.

The input unit 114 consists of a pointing device such as a keyboard, a dedicated pen or a mouse for inputting characters, commands, etc.

The old information access management unit 115 pre-stores information (which is not necessarily updated one) corresponding to that stored in the memory unit 113, and registers/manages a record which indicates that the information prestored in the unit 115 was accessed while desired information could not be accessed through the network 120 because, for example, the apparatus 110 was traveled.

The log file unit 117 is a storage for storing, when a node and a link included in hypermedia information are accessed, an identifier indicative of the node and an access record indicating that the link has been accessed.

The central processing unit 118 controls the operations of each of the units 111–117.

Figure 2:
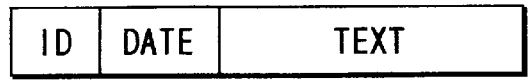
FIG. 2 is a view, showing an example of information transmitted from a server through a network shown in FIG. 1.
Figure 3:
FIG. 3 is a view, showing an example of an information format stored in a storage incorporated in the portable information processing apparatus of FIG. 1.

FIG. 2 shows an example of an information item supplied from the server 130 through the network 120. As is shown in FIG. 2, this information item involves "Identifier (ID)", "Date" and "Text". FIG. 3 shows an example of an information item stored in the memory unit 113. As is shown in FIG. 3, this information item involves "Identifier (ID)", "Date", "Flag A (indicative of whether the information item is included in a series of information items)", "Flag B (indicative of whether the information item is annotated) and "Text".

The identifier "ID" is assigned to each of information items to identify it, and also serves as an address for accessing the information item. "Date" (date information) indicates the date (storage date) on which the information item with the "ID" is stored in the memory unit 113. "Date" may indicate the date (creation date) on which the information item is created.

"Flag A" indicates whether target information item is included in a series of information items or independent therefrom. When in the embodiment, the value of Flag A is "1", Flag A indicates that the target information item is included in the series of information items, and that the target information item is stored in the memory unit 113 together with other information items with other IDs. When the value of Flag A is "0", Flag A indicates that the target information item is an independent information item.

Flag B indicates whether the target information item is annotated by the user using the input unit 114. When in the embodiment, the value of Flag B is "1", the target information item is annotated, while when the value is "0", it is not annotated. The annotation is stored and managed in relation to the target information item.

"Text" corresponds to the main body of the target information item, and can be displayed on the screen of the display unit 112 in the form, for example, of a document.

The basic operation of the portable information processing apparatus 110 incorporated in the system of FIG. 1 to access information will now be described with reference to the flowchart of FIG. 4.

In the embodiment, identifiers ID are assigned to all information items stored in the server 130, respectively, and are not changed even if the information items are updated. Further, in the server 130, the creation date of each information item is managed such that it is updated each time the information item is updated.

When the user operates the input unit 114 of the portable information processing apparatus 110 to take in a desired information item with an identifier "P" from the server 130 (step 301), the central processing unit 118 of the apparatus 110 causes the network communication unit 111 to examine whether the apparatus 110 is connected to the network 120 (step 302).

If they are not connected to each other, it is determined whether the information item with the identifier "P" is already stored in the memory unit 113 (step 303). If the information item with the identifier "P" is stored in the memory unit 113, the central processing unit 118 registers the identifier "P" in the old information access management unit 115 (step 304), and displays on the display unit 112 information (text) item stored in the memory unit 113 and having the identifier "P" (step 305).

The user can annotate the information displayed on the display unit 112, using the input unit 114 (e.g. a dedicated pen). In this case, the central processing unit 118 sets to 1 the Flag B of the annotated information. Data indicative of the annotation is stored in the memory unit 113 in relation to the annotated information.

On the other hand, if the memory unit 113 stores no information which has the identifier "P", the central processing unit 118 registers the identifier "P" in the unaccessed-information management unit 116 (step 306), and informs the user that the information item with the identifier "P" is inaccessible (step 307).

If it is determined in the step 302 that the portable information processing apparatus 110 is connected to the network 120, the central processing unit 118 determines whether or not the information item with the identifier "P"

is already stored in the memory unit 113 (step 308). If the information item with the identifier "P" is stored in the memory unit 113, the central processing unit 118 examines the Flag A of the information (step 309). The reason why the Flag A is examined will be explained.

In the embodiment, a series of information items requested by the user can be stored at a time in the memory unit 113 of the apparatus 110. The Flag A assigned to each of the series of information items stored in the memory unit 113 is set to "1" by the central processing unit 118. At the time of accessing part of the series of information items, it is desirable to avoid a state in which some of the series of information items are updated, and the others are not updated. To this end, when the information item with the identifier "P" can be taken-in from the server 130, if the information item with the identifier "P" is already stored in the memory unit 113, the state of the Flag A of the already stored information is examined to determine whether or not it was stored in the memory unit 113 together with information items with other identifiers.

If the Flag A of the information item with the identifier "P" is set to "1", the central processing unit 118 determines that the information was stored in the memory unit 113 together with other information items with other identifiers. If in this case, the updated version of the information item is stored in the server 130, and if the updated version is taken into the memory unit 113, a disadvantage will occur in which the information item with the identifier "P" is of the updated version and the other information items stored together with it are of an old version. To avoid this, the central processing unit 118 does not take in from the server 130 the information item with the identifier "P" when the Flag A thereof is set at "1", but displays on the display unit 112 the information (text) item with the identifier "P" stored in the memory unit 113 (step 305).

If, on the other hand, the Flag A of the information item with the identifier "P" is set at "0", the central processing unit 118 determines whether or not the information item with the identifier "P" stored in the memory unit 113 is of the updated version (step 310). If it is of the updated version, the unit 118 takes in the information (text) item with the identifier "P" stored in the memory unit 113 and displays it on the display unit 112 (step 305). If it is not of the updated version, the unit 118 controls the network communication unit 111 so as to take in the information item with the identifier "P" from the server 130 and store it in the memory unit 113 (step 311), thereby updating the already stored information item with the identifier "P" and displaying the updated information (text) item on the display unit 112 (step 305).

Whether or not the information stored in the memory unit 113 is of an updated version is examined in the following manner:

First, the central processing unit 118 of the portable information processing apparatus 110 controls the network communication unit 111 so as to transfer to the server 130 the date and the identifier assigned to the to-be-examined information item stored in the memory unit 113, thereby to inquire whether or not the to-be-examined information item is of an updated version.

The server 130 selects, from information items stored therein, an information item with the same identifier as that transferred from the portable information processing apparatus 110, thereby comparing the creation date of the selected information item with the date (i.e. the storage date) transferred from the apparatus 110. If the date transferred from the apparatus 110 is later than or identical to the creation date (if the former is identical to the latter where the date assigned to the information stored in the memory unit 113 is a creation date), it is determined that the information item with the same identifier stored in the apparatus 110 is of the updated version. On the other hand, if the date transferred from the apparatus 110 is older, the server 130 determines that the information item with the same identifier stored in the apparatus 110 is of an old version. The determination result is transferred from the server 130 to the apparatus 110, and then the central processing unit 118 determines whether or not the information item with the same identifier stored in the memory unit 113 is of the updated version.

It may be modified such that the portable information processing apparatus 110 inquires the creation date of a target information item of the server 130 by supplying the server 130 with an identifier assigned to the information item, that the server 130 in turn supplies the apparatus 110 with the creation date of an information item with the same identifier which the server manages, and that the apparatus 110 compares the dates to determine whether or not the target information item is of the updated version.

In the embodiment, the user of the portable information processing apparatus 110 takes, into the memory unit 113, an information item tried to be accessed while the apparatus 110 is traveled, when the apparatus 110 has been connected to the network 120. Concerning the take-in operation, two procedures are prepared, and one of them can selectively be designated.

In a first procedure, updated versions of information items accessed or tried to be accessed during traveling are automatically taken in at a time. In a second procedure, each time an information item tried to be accessed during traveling is determined not to be of an updated version, the user is inquired of whether or not its updated version should be taken in.

Referring first to the flowchart of FIG. 5, the operation of the portable information processing apparatus 110 will be described, which is assumed if the first procedure for taking-in information tried to be accessed during traveling at a time is selected when connection of the apparatus 110 to the network 120 has been permitted.

First, the central processing unit 118 of the apparatus 110 determines whether or not the unaccessed-information management unit 116 registers an identifier or identifiers (step 401). If the unit 116 registers an identifier or identifiers, the state of access during traveling based on all the registered identifiers is displayed on the display unit 112 in the form, for example, of a list of identifiers which could not be accessed during traveling (step 402). Then, the central processing unit 118 controls the network communication unit 111 so as to request the server 130 to transfer information items corresponding to all the identifiers stored in the unaccessed-information management unit 116, thereby loading them into the memory unit 113 in the apparatus 110 (step 403). At the same time, the central processing unit 118 deletes those identifiers from the unaccessed-information management unit 116.

Thereafter, the central processing unit 118 determines whether or not the old information access management unit 115 registers an identifier or identifiers (step 404). If the management unit 115 registers an identifier or identifiers, the processing unit 118 determines, by inquiring it of the server 130 as in the step 310, whether or not each of all information items stored in the memory unit 113 and indicated by the identifiers registered in the management unit 115 is of an updated version (step 405). If it is not of an updated version, the processing unit 118 controls the network communication unit 111 so as to request the server 130 to transfer the updated version of each of the information items corresponding to the registered identifiers, thereby taking the updated versions into the memory unit 113 of the apparatus 110 to update the corresponding old information items (step 406). At the same time, the processing unit 118 deletes those identifiers from the old information access management unit 115.

Figure 4:
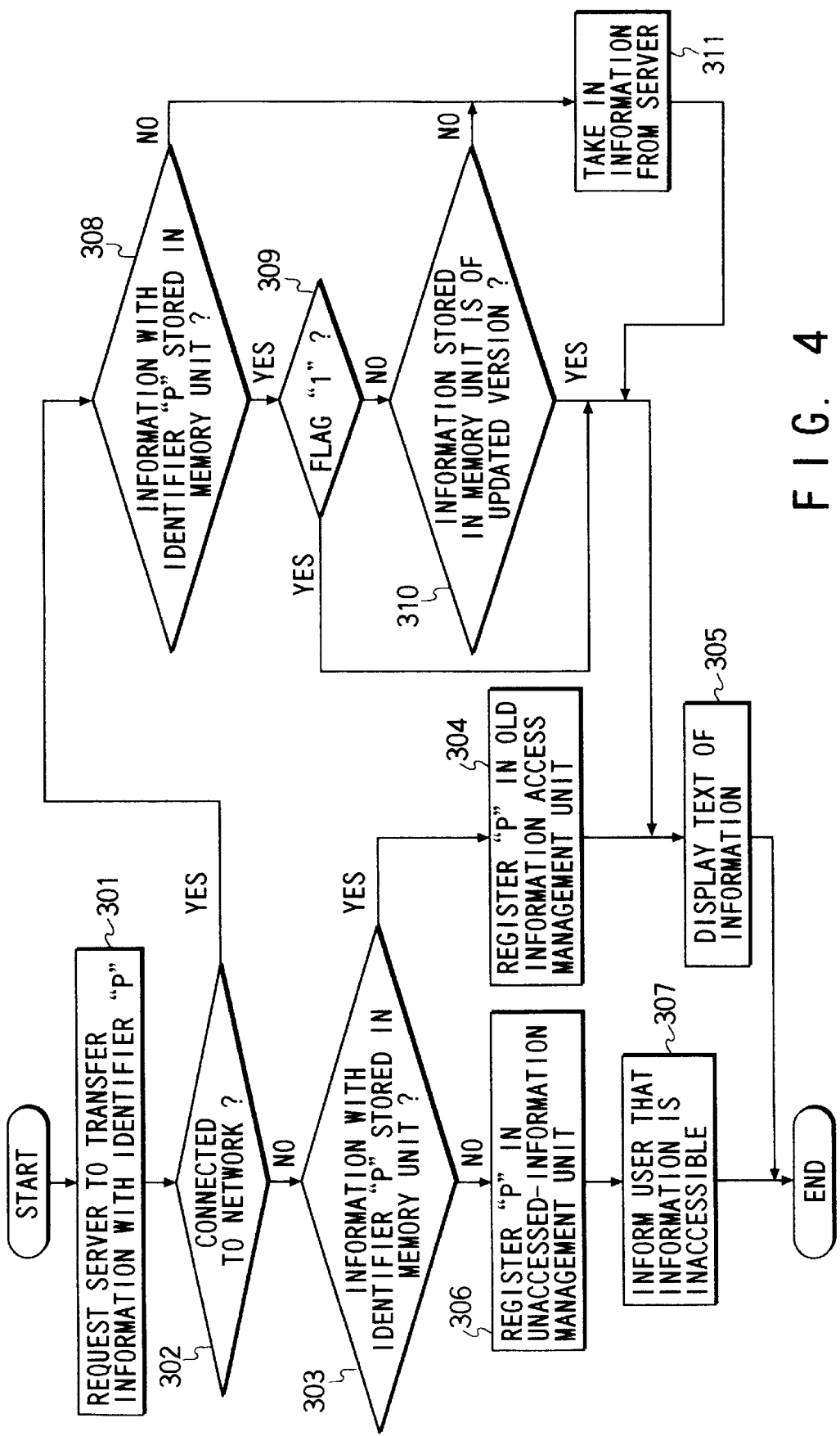
FIG. 4 is a flowchart, useful in explaining the information access operation of the portable information processing apparatus of FIG. 1.

As regards an information item with a Flag A value of "1", whose explanation is omitted in the flowchart of FIG. 5, it is not determined whether or not the information item is of an updated version and no updated version is taken in from the server 130 irrespective of whether the information item is of an updated version, as in the case where it is determined in the step 309 of the flowchart of FIG. 4 that the Flag A is set to "1".

Figure 6:
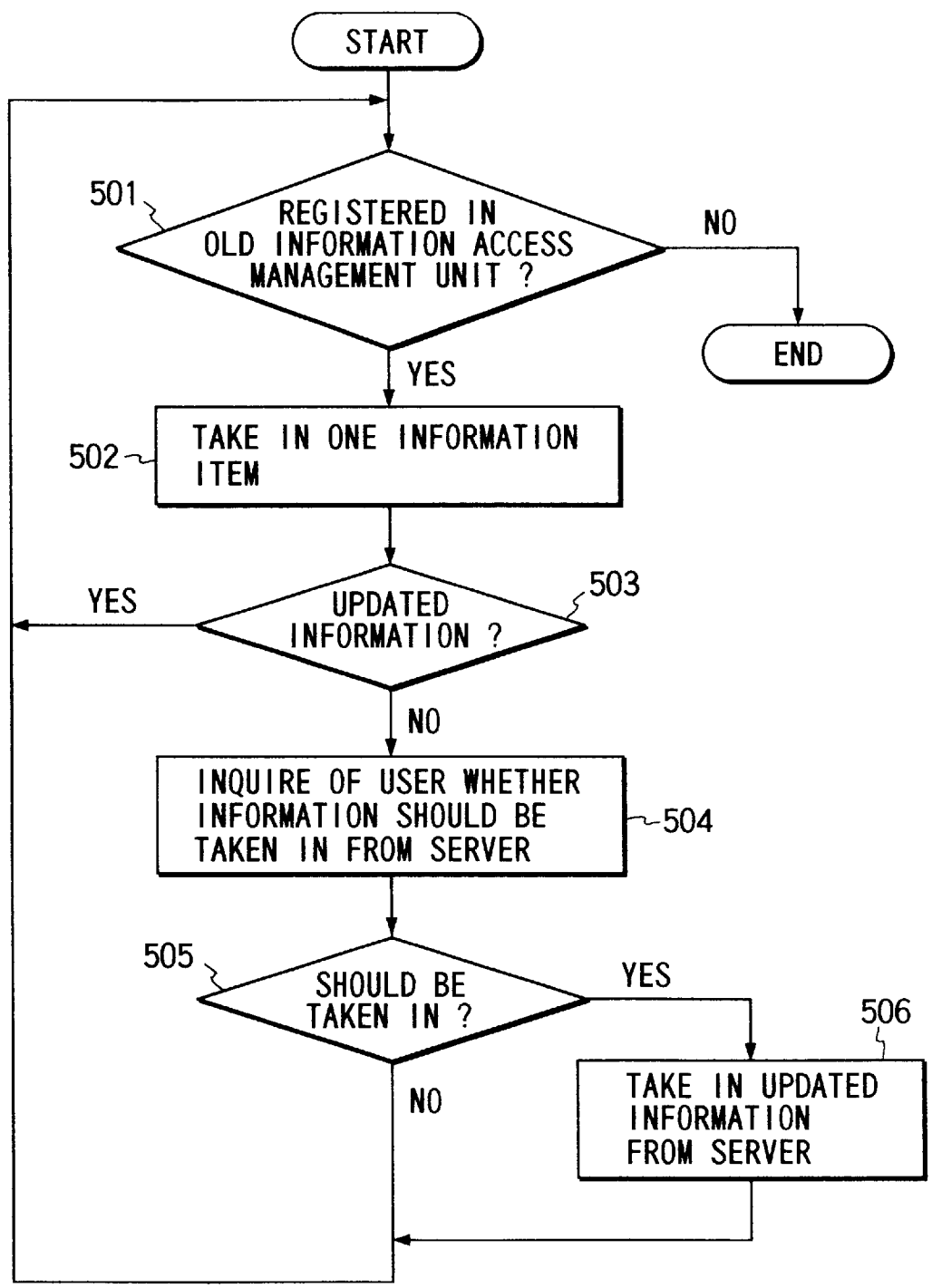
FIG. 6 is a flowchart, useful in explaining the processing to dialogically take in all information tried to be accessed during traveling.

Referring then to the flowchart of FIG. 6, the operation of the portable information processing apparatus 110 will be described, which is assumed if the second procedure for dialogically taking in information tried to be accessed during traveling is selected when connection of the apparatus 110 to the network 120 has been permitted. FIG. 6 does not show the manner of taking in information items indicated by identifiers registered in the unaccessed-information management unit 116. This take-in operation is performed before the processing described below, as in the case of the first procedure.

The central processing unit 118 of the apparatus 110 determines whether or not the old information access management unit 115 registers an identifier or identifiers (step 501). If the answer to the question in the step 501 is Yes, one of information items indicated by the identifiers registered in the unit 115 is read from the memory unit 113 (step 502). Subsequently, it is determined whether or not the read information item is of an updated version, by inquiring it of the server 130 as in the step 310 (step 503).

If the information item is not of an updated version, the central processing unit 118 inquires of the user, via the display unit 112, whether or not the updated version of the information item indicated by the identifier should be taken in from the server 130 (step 504). If the user answers Yes to the question in the step 504 using the input unit 114 (step 505), the central processing unit 118 controls the network communication unit 111 so as to request the server 130 to transfer an updated information item corresponding to the identifier, thereby taking it into the memory unit 113 of the apparatus 110 to update the corresponding old information item (step 506). At the same time, the processing unit 118 deletes the identifier from the old information access management unit 115.

The central processing unit 118 performs the above-described processing for each of information items indicated by the identifiers registered in the old information access management unit 115.

Although in the above-described embodiment, information items indicated by the identifiers registered in the old information access management unit 115 are taken in the order of registration of the identifiers, the present invention is not limited to this. It may be modified, for example, such that take-in of an information item with a Flag B value of "1" (i.e. an annotated information item) is prior to the take-in of the other information items, thereby performing examination as to whether or not the taken-in information item is of an updated version. This priority processing suits the user's convenience since the annotated information is more important to the user than the other. If there are a plurality of annotated information items, the order of their take-in is made to correspond to the order of registration of the identifiers.

Moreover, although in the above-described embodiment, an old information item is updated by taking its updated version from the server 130 and storing it in the memory unit 113 of the apparatus 110, the present invention is not limited to this. For example, suppose that where information tried to be accessed when the apparatus 110 could not be connected to the network 120 is stored in the memory unit 113 of the apparatus 110 and displayed on the display unit 112 (steps 301–305), the user has annotated the information using the input unit 114. In this case, the annotated information may be stored as an old version (i.e. with a Flag B value of "1") without being updated, when connection of the apparatus 110 to the network 120 has been permitted and take-in of an updated version corresponding to the annotated information has been permitted (steps 501–506). This enables the user to avoid the disadvantage that only the annotation added to the information by the user is made to remain, with the result that both the annotation and the annotated information can be stored.

Furthermore, concerning information with a Flag A value of "1", it may be modified such that the program returns to the step 501 without performing the processing in the step 503 for determining whether or not the information is of an updated version. In this case, the information with the Flag A value of "1" is not considered the object about which determination as to whether its updated version is taken in from the server 130 is performed.

A description will now be given of those information items stored in the server 130 and in the portable information processing apparatus 110 (i.e. in the memory unit 113), which have a hypermedia structure comprising nodes and links. The hypermedia structure means a structure as represented by the structure of a hypertext, in which information indicative of the relation between data items related to each other is provided for promptly reading and displaying one of the related data items where the other is, for example, displayed.

Figure 7:
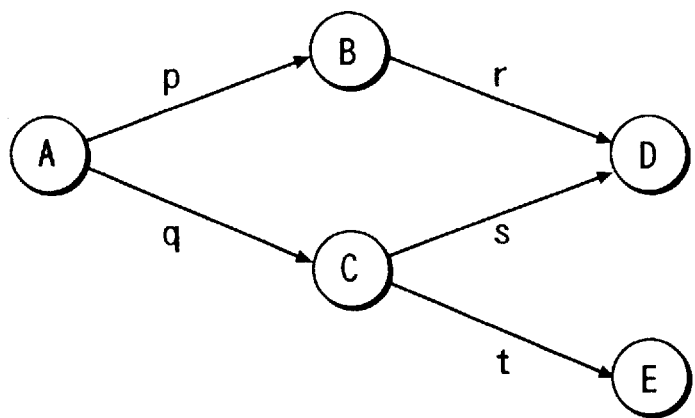
FIG. 7 is a view, showing an example of hypermedia information stored in the server shown in FIG. 1.

FIG. 7 shows an example of information of the hypermedia structure stored in the server 130. In FIG. 7, reference symbols A, B, C, D and E represent "nodes", respectively, and reference symbols p, q, r, s and t "links", respectively.

Figure 8:
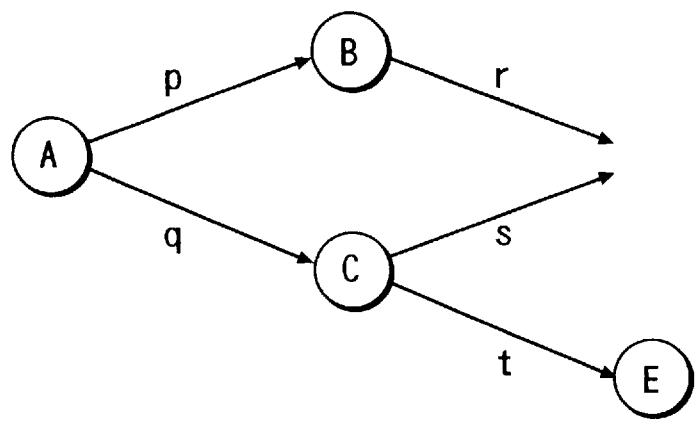
FIG. 8 is a view, showing an example of hypermedia information stored in a memory incorporated in the portable information processing apparatus shown in FIG. 1.

FIG. 8 shows an example of hypermedia information stored in the memory unit 113 of the portable information processing apparatus 110. As is evident from the comparison between the FIG. 8 case and the FIG. 7 case, in the FIG. 8 case, the nodes A, B, C and E are already taken in from the server 130 and stored in the memory unit 113, whereas the node "D" is not stored in the memory unit 113.

Suppose that the user tried, during traveling (i.e. during the time when the portable information processing apparatus 110 could not be connected to the network 120), to see information at the node D via the node A, the link p, the node B and the link r. In general, each link is indicated by a corresponding button on the screen of the display unit 112. The user can see, under the control of the central processing unit 118, information at a predetermined node which is the destination of a predetermined link, by selecting the predetermined link using the input unit 114 (formed of a dedicated pen, etc.).

In the FIG. 8 case, the central processing unit 118 will recognize after tracing the link r that the memory unit 113 does not store the node D. When the memory unit 113 does not store information at the node D requested by the user (where the portable information processing apparatus 110 cannot be connected to the network 120), the central processing unit 118 registers an identifier indicative of the node D in the unaccessed-information management unit 116 as in the processing in the step 306. Moreover, in this case, the processing unit 118 records in the log file unit 117 data indicating that it tried to access the node D via the node B and the link r, and informs the user, via the display unit 112, of the fact that the requested information at the node D is not stored in the memory unit 113.

When the processing unit 118 has accessed information at a node requested by the user, it refers to the unaccessed-information management unit 116. If an identifier assigned to a node linked to the requested node is registered in the unit 116, the processing unit 118 inactivates the linkage to the node linked to the requested node.

Accordingly, when the processing unit 118 accesses the information, for example, at the node C after it tries to access the node D via the link r, it inactivates the link s directed from the node C to the node D since the identifier indicating the node D is registered in the unaccessed-information management unit 116. At the time of inactivating the link s, for example, a button for the link s is set to a color indicating that its selection is prohibited. Alternatively, the input unit 114 may be set such that the user cannot select the bottom for the link s even if he tries to do so using the unit 114.

As described above, the use of a useless link by the user can be avoided by registering in the unaccessed-information management unit 116 an identifier indicative of information at a node which was tried to be accessed, and inactivating a link directed to the node when the node is again tried to be accessed.

Thereafter, when the portable information processing apparatus has been connected to the network 120, the central processing unit 118 takes in, from the log file unit 117, an identifier indicative of a node which is directly linked to and has firstly accessed to a node (i.e. the node D in the FIG. 8 case with an identifier registered in the unaccessed-information management unit 116) which is not stored in the memory unit 113 and hence could not be accessed. That is, the central processing unit 118 takes in an identifier indicative of the node B. Then, the processing unit 118 displays, on the display unit 112, information with the taken-in identifier, i.e. the information at the node B linked to the unaccessed node D. As a result, the circumstances during traveling of the apparatus 110 can be reproduced.

As described above in detail, if information items are tried to be accessed when the apparatus 110 cannot be connected to the network (while the apparatus is traveled), the apparatus of the present invention stores accessed information in the old information access management means or unit 115, and unaccessed information in the unaccessed-information management means or unit 116, and manages the information items using its creation date or storage date. As a result, the apparatus of the present invention can effectively take in information of an updated version from the network when connection of the apparatus to the network has been permitted.

Moreover, when the apparatus of the present invention has been connected again to the network, it can effectively take in the updated version of an information item which is considered important among information items tried to be accessed during traveling, by annotating the important information item and taking in the annotated information item prior to the other information items.

Also, in the case of accessing information of a hypermedia structure comprising nodes and links, the apparatus of the present invention records the circumstances at the time of accessing a node which is not stored therein, and reproduces the circumstances when it has been connected to the network. Thus, the apparatus enables the user to judge whether or not the information at the node was actually necessary.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, although the embodiment is directed to the portable information processing apparatus capable of taking in information through a network connected thereto, the present invention is not limited to such a portable apparatus, but may be an another type apparatus if it can take in information stored in a server on the network.

I claim:

1. An information processing apparatus comprising:
   network communication means which can be connected to a network for taking, from a server on the network, an information item discriminated by an identifier dedicated thereto;
   storage means for storing the information item with a creation date or a storage date attached thereto;
   a display unit for displaying the information item;
   an input unit for adding another information item to the displayed information item;
   unaccessed-information management means for registering therein, in a first state in which an information item having the same identifier as an information item tried to be accessed when the information processing apparatus could not be connected to the network is not stored in the storage means, the same identifier, the registered same identifier being used when the information processing apparatus is connected to the network; and
   old information access management means for registering therein, in a second state in which an information item having the same identifier as an information item tried to be accessed when the information processing apparatus could not be connected to the network is stored in the storage means, the same identifier, the registered same identifier being used when the information processing apparatus is connected to the network.

2. The information processing apparatus according to claim 1, further comprising display means for controlling the display unit in the second state so as to display thereon the information item with the same identifier stored in the storage means.

3. The information processing apparatus according to claim 2, further comprising first control means for controlling the network communication means so as to take in, from the server, an information item indicated by each identifier registered in the unaccessed-information management means when the information processing apparatus can be connected to the network.

4. The information processing apparatus according to claim 3, further comprising determination means for determining, when the information processing apparatus can be connected to the network, whether or not the information item stored in the storage means and indicated by the each identifier registered in the old information access management means is of an updated version, on the basis of a date attached to the information item stored in the storage means and a creation date of an information item currently stored in the server and having the same identifier as the information item stored in the storage means.

5. The information processing apparatus according to claim 4, further comprising second control means for controlling the network communication means so as to take in, from the server, an information item of an updated version having the same identifier as the information item stored in the storage means, when the determination means has determined that the information item stored in the storage means is of the updated version.

6. The information processing apparatus according to claim 5, wherein each information item stored in the storage means includes a series-of-data display flag indicating whether or not the information item is included in a series of information items accessed at a time.

7. The information processing apparatus according to claim 6, further comprising determination prohibition means for determining, when the information processing apparatus can be connected to the network, whether or not the information item is included in a series of information items accessed at a time, with reference to the series-of-data display flag which is included in the information item stored in the storage means and indicated by the each identifier registered in the old information access management means, thereby prohibiting the determination by the determination means when the information item is included in the series of information items.

8. The information processing apparatus according to claim 5, wherein the determination means determines, even if an information item having the same identifier as an information item tried to be accessed when the information processing apparatus was connected to the network is stored in the storage means, whether or not the information item stored in the storage means is of an updated version, using a date attached to the information item stored in the storage means and a creation date of the information item currently stored in the server and having the same identifier as the information item stored in the storage means.

9. The information processing apparatus according to claim 8, wherein each information item stored in the storage means includes a series-of-data display flag indicating whether or not the information item is included in a series of information items accessed at a time.

10. The information processing apparatus according to claim 9, further comprising determination prohibition means for determining, when the information processing apparatus can be connected to the network, whether or not the information item is included in a series of information items accessed at a time, with reference to the series-of-data display flag which is included in the information item stored in the storage means and indicated by the each identifier registered in the old information access management means, thereby prohibiting the determination by the determination means when the information item is included in the series of information items.

11. The information processing apparatus according to claim 5, wherein each information item stored in the storage means includes an annotation display flag indicating whether or not the information item is annotated.

12. The information processing apparatus according to claim 11, wherein the determination means refers to the annotation display flag included in each of the information items stored in the storage means and indicated by the identifiers registered in the old information access management means, thereby performing determination as to whether each information item is of an updated version in the order beginning from the annotated information item.

13. The information processing apparatus according to claim 12, wherein when the annotation display flag included in an old information item stored in the storage means and corresponding to the information item of the updated version indicates that the old information item is annotated, the second control means makes the old information item left as an old version of the updated information item.

14. The information processing apparatus according to claim 5, wherein information of a hypermedia structure comprising nodes and links is processed.

15. The information processing apparatus according to claim 14, further comprising third control means for informing the user, in the first state, that access to an information item at a target node has been tried, via the display unit under the control of the display means, only when the access has been tried for the first time, and thereafter inactivating a link extending between the target node and another node leading thereto.

16. The information processing apparatus according to claim 15, further comprising access record management means for storing an identifier indicative of a node tried to be accessed through another node, and a record of access to a link connecting both the nodes.

17. The information processing apparatus according to claim 16, further comprising fourth control means for referring, when connection to the network has been permitted, to an identifier indicative of the node, which could not be accessed and hence is registered in the unaccessed-information management means, and also to the record of access stored in the access record management means, thereby to detect the node located immediately before the node tried to be accessed, and to display the detection result on the display unit by means of the display means.

18. An information access method employed in an information processing apparatus which can be connected to a network for taking, from a server on the network, an information item discriminated by an identifier dedicated thereto, and storing the information item, comprising the steps of:

storing the information item with a creation date or a storage date;

registering, in a first state in which an information item having the same identifier as an information item tried to be accessed when the information processing apparatus could not be connected to the network is not stored in the information processing apparatus, the same identifier;

registering and displaying, in a second state in which an information item having the same identifier as an information item tried to be accessed when the information processing apparatus could not be connected to the network is stored in the information processing apparatus, the same identifier; and taking in, through the network, an information item stored in the server and indicated by the identifier registered in the first state, and determining whether or not the information item stored in the information processing apparatus and indicated by the identifier registered in the second state is of an updated version, on the basis of a date attached to the information item stored in the information processing apparatus and a creation date of an information item currently stored in the server and indicated by the same identifier as that of the information item stored in the information processing apparatus, thereby taking in, from the server through the network, the information item of the updated version if the information item stored in the information processing apparatus is older than the information item of the updated version, when the information processing apparatus is connected to the network.

* * * * *